Patented Dec. 9, 1952

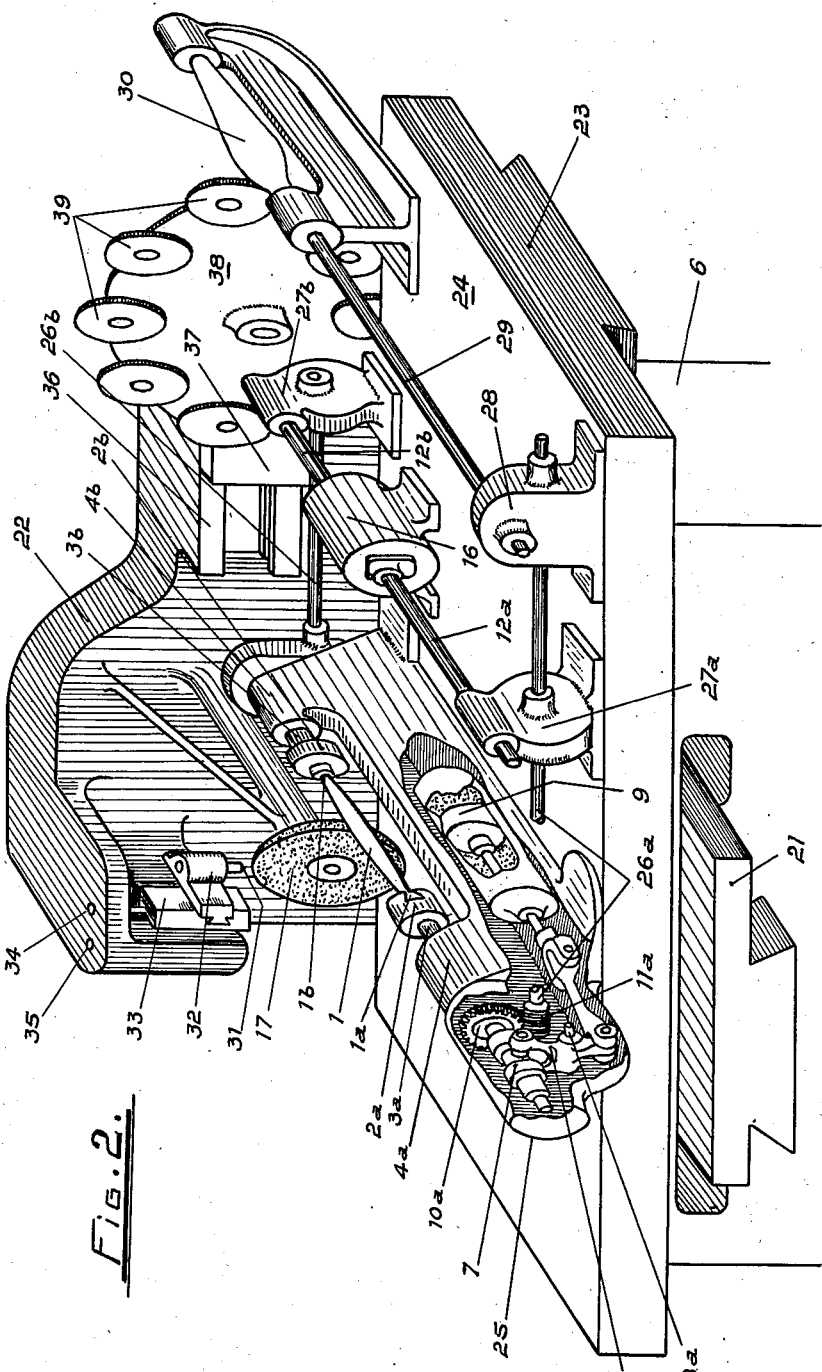

2,620,601

UNITED STATES PATENT OFFICE 2,620,601

MACHINE FOR THE MANUFACTURE OF BLADES FOR TURBOJET ENGINES

Paul Joseph Léon Rémy, Issy-les-Moulineaux, France, assignor to Societe des Ateliers de Mecanique et de Pyrotechnie S. M. P., Paris, France, a joint-stock company of France Application November 27, 1951, Serial No. 258,468
In France September 29, 1951

1 Claim. (Cl. 51—101)

The present invention relates to a method and a machine for the machining by rotation of long, flat and thin elements and, more particularly, for the production of turbo-jet reactor blades.

It is known that if the manufacture of the base of the blade serving to anchor the latter offers no special difficulty, it is quite the opposite as regards the production of the blade proper which, in the actual state of the art, sets problems that are particularly complicated to solve.

Up to the present, the methods which have been tried or considered lead to a hold up in the manufacture of the said elements, said hold up originating either from the difficulties of manufacture in itself or from the great consumption of tools serving for the manufacture of the blades.

These different methods, used or being considered at the present time, are the following:

(1) By moulding, either with lost wax as in dental prosthesis, or with frozen mercury.

The main drawback of this method is the lack of mechanical homogeneity of the elements.

A very strict supervision in the production of the metal and in the casting does not in fact exclude inclusions and flaws which may cause rupture.

Finally, as the metal is not wrought and therefore not fibered, it will never possess the characteristics of resistance of the metal subjected to the said treatment.

(2) By sintering, following a method of manufacture identical with that of tungsten carbides. The said method which is more economical than the previous one, has the same disadvantages as regards resistance.

(3) By stamping and shaping of a hollow blade either by means of two shaped and welded half sheet-metal shells, this solution coming up against very complicated welding problems due to the lack of homogeneity and the deformations caused by the welding, or by stamping which allows of producing the blade without welding, this solution offering however such difficulties that a practical embodiment has proved for the moment unrealizable.

(4) By rolling by means of a method closely inspired from the method of manufacture of knife blades, said blades in their general lines being related to profiled blades.

However, since the leading and trailing edges cannot be finished by rolling, they would require substantial machining in order to finish the same.

(5) By forging, the element being produced by dieing to finished dimensions.

This method involves a huge consumption of dies that are very costly due to the time taken to produce them and to the considerable number of copying machines required to ensure their manufacture. It requires, furthermore, minute care during the dieing operation itself.

In addition, the blades cannot be completely finished by this operation and the trailing and leading edges must be machined.

Finally, the accuracy of the profiles can only be approached to within a few tenths of a millimetre for mass production.

(6) By mechanical machining. This method, which is the only one employed originally and is still being used now for prototypes, has been discarded for mass production in view of machining difficulties and the enormous means which must be brought into play to keep up with the rates of manufacture necessary for the equipment of a modern air power in turbo-jet engines.

The difficulties which necessitated giving up this method originate from the little rigidity offered by the blade when the pressure of the tool is exerted perpendicularly to the faces of the blade, that is to say in the direction of its smallest thickness.

It has indeed been attempted to give more rigidity to the blade by machining it directly in a block having the section of the base of the blade and by therefore trying to obtain directly the profile in a single pass, the blade being solidly fixed by its base in the mounting. But it is obvious that the length of the blade, relative to the section of the block, is such that it cannot be prevented from vibrating under the strain of the tool, even by supporting it by means of a tail-stock on the opposite side to its attachment to the machine.

This method moreover requires considerable work on the part of the tool due to the great thicknesses which have been left to improve the rigidity, and the result is: an abnormally rapid wear of the tool; a very great slowness of the work and, consequently, low production; vibrations shown on the element by an appreciable roughness of the whole surface which takes much time to polish; differences in the accuracy of the profiles; exaggerated consumption of very costly metal, in view of the extra thicknesses to be removed.

One of the objects of my invention is a method allowing stamped turbo-jet blades to be machined by means of a grindstone with only the normal extra thicknesses necessary for conventional dieing, that is to say of the order of 1 to 2 mm.

Another object of my invention is to provide a method of machining turbo-jet blades by which the loss of high cost metal is reduced to an admissible percentage.

Another object of my invention is to provide a method which imparts to the blade, during the machining of its profile, a rigidity such that the drawbacks of the above mentioned present-day methods are eliminated.

Another object of my invention is to provide a machine for the machining of turbo-jet blades and for putting the above method into practice.

Other objects of my invention will become apparent from the following description, with reference to the accompanying drawing, in which:

Fig. 2 is a perspective view of a machine for machining turbo-jet blades, carrying out the method according to my invention.

Figure 1:
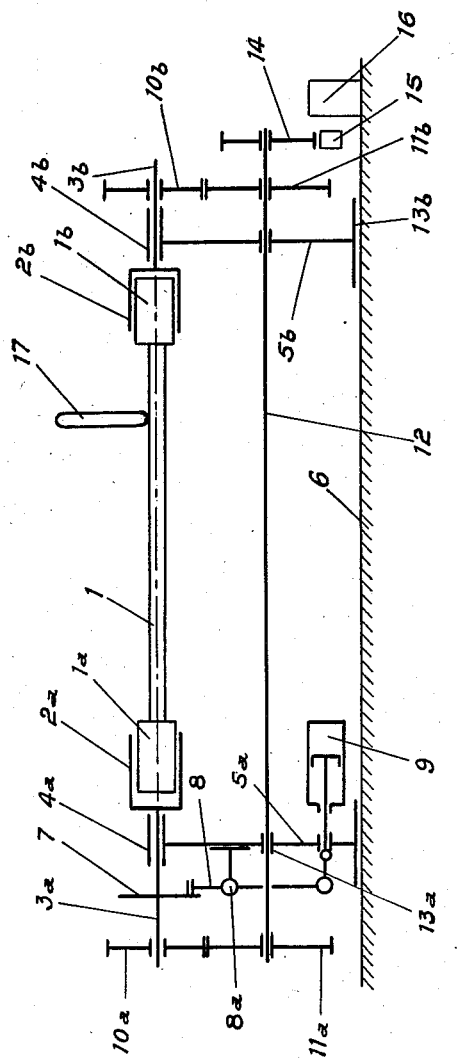
Fig. 1 is a general diagram of the method according to my invention.

The method according to my invention is fundamentally characterized by the following points:

(1) The element to be machined 1 (see Fig. 1) is rigidly secured by its two ends 1a and 1b to co-axial driving chucks 2a and 2b of any suitable type capable, on the one hand, of ensuring the rotation of the element and, on the other hand, of submitting the same to considerable traction during machining.

(2) The chucks 2a and 2b are rotated in the same direction and strictly at the same speed. To this end, the chucks are interconnected by means of a positive kinematic chain which I have shown diagrammatically in Fig. 1 as composed of gear train 10a, 10b, 11a, 11b, the first two gears being secured to the spindles 3a, 3b carrying the chucks and the two others to a shaft 12 rotated by a motor 16, through the medium of a pinion 15 and a toothed wheel 14.

(3) The securing chucks 2a, 2b for the blade 1 are provided with a device which enables the blade to be subjected to considerable traction, during its machining by a grindstone 17. I have shown this traction device diagrammatically as composed of a plate 7 rigid with the pin 3a of the chuck 2a and on which bears the end roller of a lever 8 which is hinged to an intermediary point 8a, the other end of which is subjected to the action of a cylinder and piston control device 9.

A reproducing member of any conventional type, which will be described in detail hereafter, controls the relative displacement between the element to be machined 1 and the grindstone 17 in response to the relative displacement between a feeler roller and a master form.

The method according to my invention offers the following fundamental advantages:

(a) The blade, being rigidly embedded by its ends in its chucks possesses, due to this, a resistance to bending four times greater than that which it would have if it were embedded at one end only.

(b) The blade, being rotated at its two ends through the agency of the two driving chucks, has a much smaller torsional deformation, under the pressure of the tool, than the one it would have if it were only driven at one end.

(c) The rigidity of the blade is yet considerably increased due to the fact that it is machined under traction.

Fig. 2 shows a practical embodiment of a machine for machining turbo-jet blades, carrying out the described method according to my invention.

This machine comprises a base 6 in which may slide at right angles, on the one hand, the slide-block 21 of a carriage supporting the grindstone-carrying frame 22 and, on the other hand, the slide-block 23 of the movable copying table 24.

On the copying table are arranged the securing chucks, the positive kinematic chain, the device for tensioning the element to be machined as well as the above mentioned master form.

The turbo-jet blade 1 to be machined is secured by its two ends 1a and 1b in the anchoring chucks 2a and 2b the respective spindles 3a and 3b of which are mounted in coaxial bearings 4a and 4b integral with a housing 25 secured to the table 24.

The positive kinematic chain is formed, in the example shown, of trains of pinions and endless screws, such as 10a, 11a which may be seen in the cut-away portion of Fig. 2, connected by shafts 26a and 26b to a second train of pinions and endless screws 27a and 27b. The latter are, in their turn, connected to the driving motor 16 rigid with the table 24, through the medium of the respective shafts 12a and 12b. This positive kinematic chain, while allowing the chucks 2a and 2b to be rotated in the same direction and strictly at the same speed, furthermore enables the relative fixing angle of the driving chucks to be controlled at will.

In the housing 25 are arranged the various parts of which the tensioning device is composed, including the lever 8 hinged at 8a, one end of which comprises a roller bearing on a stop 7 rigid with the spindle 3a for the chuck 2a and the other end of which is subjected to the action of the cylinder and piston control device 9.

At the end of the shaft 26a is mounted a bevel gear 28 driving a shaft 29 serving to rotate the master form 30.

On the grindstone-bearing frame 22 are arranged:

(1) The grindstone proper 17;

(2) A unit for truing the grindstone and including: a diamond 31 mounted on a diamond-carrying carriage 32, itself mounted on a diving carriage 33; a control spindle 34 for the rack of the diamond-carrying carriage; a spindle 35 for driving the diving carriage for the diamond carrier.

(3) A slide-block 36 in which may slide a carriage 37 supporting the drum 38 carrying feeler rollers 39.

The operation for profiling the blade 1 may advantageously be carried out in two successive cutting strokes, viz.:

(1) A blank cutting stroke to $\frac{2}{10}$ or $\frac{3}{10}$ mm. from the finished dimension;

(2) A finishing cutting stroke of 2 to $\frac{3}{100}$ mm., after truing of the grindstone to the diameter corresponding to that of the reproducing feeler roller 39.

The amount by which the grindstone is trued is advantageously determined in an experimental manner once for all in function of its wear, the diameter of the reproducing rollers being deducted therefrom. Hence, these rollers may be arranged on a revolving drum offering to the feeler the roller corresponding to the diameter of the grindstone, in accordance and progressively with its wear truing operations, until the grindstone is completely used up.

Having shown and described an embodiment of my invention, it is obvious that changes and modifications may be made thereto within the

I claim:

Machine for machining by rotation long, flat and thin parts and, more particularly, turbo-jet blades, the said machine including in combination a copying table, movable relative to the base of the machining and on which are arranged: two securing and rotating devices for the blade to be machined, having a common rotation axis, a motor, gear trains connecting the said motor to the said securing devices for rotating them in the same direction and strictly at the same speed, an adjustable control mechanism for increasing the spacing between the said securing devices and subjecting the blade to be machined to considerable tension during machining, a master form, a gear train connected to the said motor for rotating the said master form; a tool carrying carriage movable relative to the said movable copying table a rotative tool mounted on the said tool-carrying carriage and in contact with the blade to be machined, a feeler roller carrying carriage movable relative to the said tool-carrying carriage, and feeler rollers mounted in a revolving drum on the said roller-carrying carriage and placed selectively in contact with the said master form.

PAUL JOSEPH LÉON RÉMY.

REFERENCES CITED

The following references are of record in the file of this patent:

UNITED STATES PATENTS

| Number | Name | Date |
|---|---|---|
| 1,755,937 | Steiner | Apr. 22, 1930 |
| 2,102,505 | Berthiez | Dec. 14, 1937 |
| 2,527,285 | Whitehead et al. | Oct. 24, 1950 |
| 2,531,921 | Schultz | Nov. 28, 1950 |